United States Patent
Burek et al.

(12)

(10) Patent No.: US 6,266,471 B1
(45) Date of Patent: Jul. 24, 2001

(54) SPLICE CLOSURE UNIVERSAL GRIP BLOCK

(75) Inventors: Denis Edward Burek, Cumming; Marc Duane Jones, Lithonia; Wesley Willing Jones, Lawrenceville, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/375,623

(22) Filed: Aug. 17, 1999

(51) Int. Cl.$^7$ .................................................. G02B 6/00
(52) U.S. Cl. ............................................. 385/137; 385/136
(58) Field of Search .................................... 385/134, 135, 385/136, 137; 174/77 R, 92, 93

(56) References Cited

U.S. PATENT DOCUMENTS

| | | | |
|---|---|---|---|
| 4,361,721 | 11/1982 | Massey | 174/92 |
| 5,155,303 | 10/1992 | Bensel, III et al. | 174/93 |
| 5,434,945 | 7/1995 | Burek et al. | 385/135 |
| 5,440,666 | 8/1995 | Burek et al. | 385/135 |
| 5,472,160 | 12/1995 | Burek et al. | 248/74.4 |
| 5,677,975 | 10/1997 | Burek et all | 385/136 |
| 5,689,607 | * 11/1997 | Vincent et al. | 385/136 |
| 5,835,658 | * 11/1998 | Smith | 385/136 |
| 5,862,290 | 1/1999 | Burek et al. | 385/135 |
| 6,085,014 | * 7/2000 | Kajiwara | 385/137 |

* cited by examiner

Primary Examiner—Georgia Epps
Assistant Examiner—Gary O'Neill
(74) Attorney, Agent, or Firm—Thomas, Kayden, Horstemeyer & Risley, LLP

(57) ABSTRACT

A grip block for holding and immobilizing elongated cylindrical members, such as cables, has a base member having a central axis and first and second pivot arms, one mounted on each side of the axis. An actuating member has a body which has two or more cable receiving channels therein which are oriented parallel to the central axis and depending actuating pins for actuating the pivot arms to force one or more cables into the discrete channels. The base and actuating member are held together by means of studs within a splice closure or by both in conjunction with a mounting bracket.

18 Claims, 11 Drawing Sheets

SPLICE CLOSURE UNIVERSAL GRIP BLOCK

FIELD OF THE INVENTION

This invention relates to optical fiber splice closures. More particularly, the invention is a universal grip block assembly for use with a cable type closure.

BACKGROUND OF THE INVENTION

Present day communications technology is directed more and more to the use of optical fibers for transmission and hence the use of optical fiber cables containing a plurality of coated or sleeved optical fibers. The cables may take any of a number of forms such as a plurality of fibers contained within a tubular protective member, thereby forming a core or bundled together in protective loose tubes surrounding a central strength member. Alternatively, the fibers may be arrayed side by side on a ribbon member, with a plurality of such ribbons being stacked to form a high fiber count cable, and which are then enclosed in a protective plastic tube or jacket. Regardless of the type of cable used, splices are necessary for joining the ends of cables, and the fibers contained within them. It is necessary, therefore to enclose the splices in a closure to contain and protect the splices of two or more fiber optic cables.

Glass optical fibers are of extremely small diameter and are relatively fragile, therefore, optical fibers must be treated more carefully in placing them and their splices, within an enclosure. The closure must anchor all cables stored within, and it must be capable of withstanding torsional and axial loads transmitted by the cable to the closure so that the splices are protected from these loads. The closure must also seal the inner and outer sheaths of the cables and maintain the seal integrity under extreme environmental conditions. The sealing must also provide a moisture barrier sufficient to prevent any moisture from reaching the fiber optic splices.

Increasingly there has been a demand that closures be supplied with the necessary components included in one package, thereby relieving the customer of the necessity of "customizing" his particular closure with the required components, and it has become a desideratum in the optical fiber splice closure art that the components necessary to complete the closure, such as the fiber splitter for routing fibers, the splice trays for holding the splices, a grip assembly for anchoring the cables entering and leaving the closure, a ground assembly for grounding the metallic strength members, and an overall protective cover for protecting the fiber optic splices contained within the closure which can be quickly mounted or removed, be capable of universal application, thereby accommodating virtually any size of cable within a specified range of cable sizes and any type of splice.

In U.S. Pat. No. 5,862,290 of Burek et al. there is shown a splice closure which meets the foregoing criteria, which is referred to as the 3000 type closure. More particularly, the patent also discloses the numerous individual components of the closure which make possible meeting of these criteria. Among these components there is shown a grip block assembly which anchors incoming and outgoing cables to the closure member. The grip block assembly comprises a lower grip member having first and second pivoted arms and an upper grip member having first and second actuating pins for actuating the pivoting arms into gripping contact with the cable. When the upper and lower grip members are tightened by means of a bolt or bolts, the cable is gripped firmly and remains, during use, substantially stationary to the housing. The terms "upper" and "lower" are not meant to indicate the position of the part in use. As will be seen hereinafter, the parts may be inverted in use, whereby the "upper" part becomes the actual lower part, and vice versa.

The cable grip assembly of that patent is such that it grips a single cable of any one of a number of diameters. However, with increased capacity of the splice closure being a principal desideratum, it becomes necessary to use some other form of grip block capable of anchoring two cables, or affording a wider range of diameters for single cables, which are both sealed using side entry, sealing ribs, eccentric shaped insert grommets.

In order to insure protection of the splices from moisture, it is current practice to form the closure out of two mating halves, with a grommet therebetween, and clamp them together. Cable entry is through openings in the grommet, which are usually supplied with inserts which seal the cable and in turn are sealed by the grommet. Such a grommet and insert arrangement is shown, for example, in U.S. Pat. No. 5,472,160 of Burek et al. In that arrangement, the grommet, which is of a resilient material suitable for moisture sealing has, at each end thereof, first and second seal members having bores therein for receiving grommet inserts which in turn have bores therein for receiving the cable. The seal members are preferably split longitudinally so that the grommet inserts, with cables extending therethrough, can be inserted in the seal member and be tightly embraced thereby. When the two halves of the housing are clamped together, the cable is tightly embraced, as are the seal member, so that a watertight seal is achieved.

In usage, it has been found that such a sealing arrangement can be vulnerable to a bending or flexing of the cable adjacent the entrance to or exit from the closure which can, in some instances, break the integrity of the seal. There have been various arrangements in the prior art for correcting this effect, one such arrangement being shown in U.S. Pat. No. 5,434,945 of Burek et al., wherein the closure is encased in a protective shell. Such an arrangement insures that the splice closure itself is virtually certain to be moisture proof.

In U.S. Pat. No. 5,862,290 of Burek et al. the foregoing sealing problem is addressed by the provision of two sealing inserts for each cable entrant or exit port which are butted together longitudinally in end to end relationship and which contain the fiber containing cables. The use of two inserts per cable is meant to insure against unseating of the inserts as a result of external flexing forces on the cable. These forces are absorbed by the outer insert while the inner insert remains unaffected, hence sealed. In this way external flexing forces do not destroy the integrity of the seal of at least one insert in each entry port. However, it has been found that there are sometimes extreme forces on the cable which might result in the unsealing of both inserts in the entry (or exit) port, such as a high degree of bending stress for large cables.

Thus, it can be appreciated that there is a need for a more versatile or universal grip block for use with a splice closure that is capable of immobilizing more than just one cable, as well as an arrangement for enhancing or insuring seal integrity at the cable entrance or exit port.

SUMMARY OF THE INVENTION

The present invention fulfills the foregoing need, in the form of an improved grip block assembly for use both in the interior and in the exterior of the splice closure, thereby immobilizing the cable at both the interior and exterior of the port through which the cable passes.

A grip block assembly must be capable of isolating torsional or axial loads transmitted by the fiber optic cable to prevent such loads from reaching and disturbing the fiber optic splices. Thus, the grip block must be capable of withstanding one hundred pounds (100 lbs.) pull out cable load and one hundred eighty degrees (180°) cable rotation and 90° bends at the cable/closure interface. In U.S. Pat. No. 5,472,160 of Burek et al. there is shown a grip block assembly which meets these requirements and, in addition, is capable of gripping individual cables in a range of 0.40 inches diameter to 0.96 inches diameter, and is, thus, of some universality. The grip block assembly of the present invention is capable of handling a much greater range of diameters of single cables, i.e., approximately 0.25 inches to 1.50 inches, which represents a significant improvement. In addition, the grip block assembly of the invention is capable of handling twin cables, i.e., pairs of cables entrant into the closure, of diameter of approximately 0.35 inches to 0.75 inches. This ability to accommodate wide diameter ranges of both dual cables and single cables imparts to the grip block assembly of the invention a degree of universality hitherto not realized in the prior art.

In greater detail, the grip block assembly of the present invention, in a preferred embodiment thereof, comprises a base member having first and second pivoted arms and a grip or actuating member having depending actuating pins for moving the pivoted arms. The base member is mounted within the closure on upwardly projecting studs which also serve to bolt the upper grip member to the base member. The actuating pins, the ends of which ride in shaped portions on the pivot arms, causing the pivot arms to pivot against the cable being gripped and to force the cable downward into a V-shaped serrated groove in the lower grip member as the nuts on the studs are tightened. Continued tightening causes the combination of the pivot arms and the V-shaped groove to grip the cable tightly, thereby anchoring it firmly within the closure. As thus far described, the grip block assembly is basically similar to the grip block assembly as shown in the aforementioned Burek et al. U.S. Pat. No. 5,472,160 (Burek '160) the disclosure of which is incorporated herein by reference. However, as will be apparent hereinafter, the V-shaped groove has been modified in accordance with the principles of the invention so that the assembly can receive and clamp in side-by-side relationship, two small diameter cables instead of a single large cable. In order that two larger diameter cables may be clamped simultaneously, a modified upper grip member is substituted for the single V-shaped groove upper grip member. The modified grip member has a raised center section within the area defined by the depending actuating pins. The center section has first and second spaced side-by-side grooves or channels which may take the shape of truncated V-shaped grooves. The twin cables to be gripped ride in the grooves, and are held securely therein by the actuating arms.

It is desirable that the axis or centerline of each of the incoming cables be maintained as straight as possible. That is, there should be no bends in the cable. Thus, the cables, when gripped by the grip block assembly, should be maintained in a straight line thereby. To this end, the upper grip member has first and second projecting bosses surrounding the bolt holes, and the positions of the base and the upper grip member are reversed, with the upper grip member resting on the stud bosses within the closure and elevated by the bosses on the member to where the incoming cables are maintained in alignment. The grip member with the single V-shaped groove must, when gripping individual cables or small diameter twin or dual cables, also be elevated. To this end, there is included in the assembly a spacer member which performs the same function as the bosses on the two-groove grip member, and elevates the grip block to where the cables entrant into the closure are in a substantially straight line. This will maintain the bottom point quantity at the same heights, so as to retain the integrity of the seal as the cables pass through the side entry, sealing ribs, eccentric shaped insert grommets.

In the case where there is a single cable passing through each port into the closure, especially where the cable has a relatively large diameter, there usually is an inherent twist in the cable, which can have a deleterious effect on the sealing properties of the grommet inserts as well as the grommet. In such a case, it is necessary, or at least highly desirable, to immobilize the cable on either side of the entrance port. To accomplish this, a second grip block is mounted on the exterior of the closure housing adjacent the entrance port by means of a unique bracket. The bracket, which will be described in greater detail hereinafter, positions the exterior grip block relative to the closure housing so that the cable is in a straight line which prevails before the entrance port, through the sealing grommet inserts, and through the interior grip block. Thus, the torsion due to the cable twist, as well as other outside force, do not affect the sealing action of the grommet inserts.

These and other features and advantages of the present invention will be readily understood from the following detailed description, read in conjunction with the accompanying drawings.

DETAILED DESCRIPTION

Figure 1:
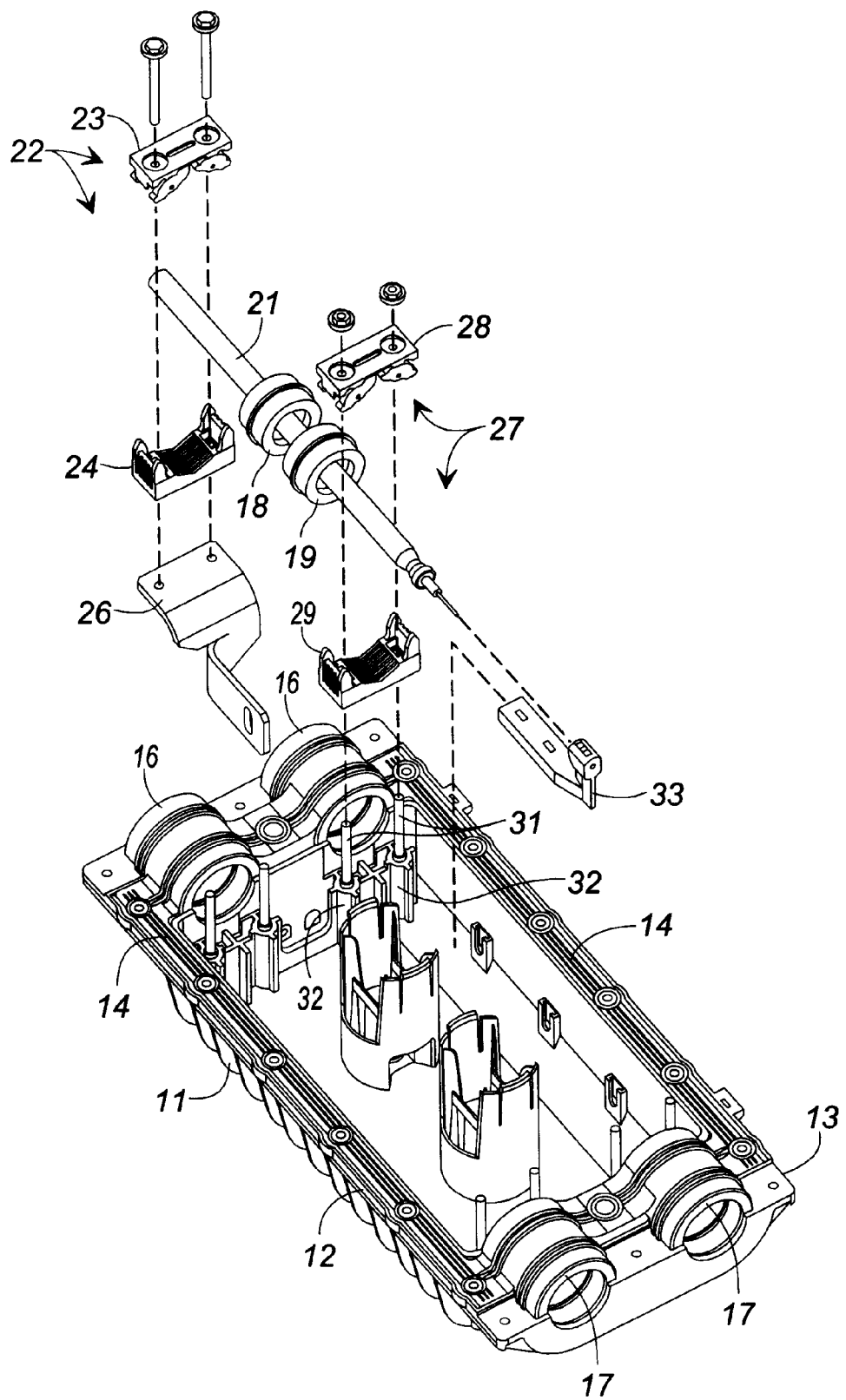
FIG. 1 is an exploded perspective view of a portion of a splice closure and the functional elements involving the present invention for use with a single cable.

In FIG. 1 there is shown the lower half-shell 11 of a splice closure of the 3000 type as shown in the aforementioned U.S. Pat. No. 5,862,290 of Burek et al., the disclosure of which is incorporated by reference herein. Only those components of the closure which bear on the present invention are shown in FIG. 1. It is to be understood that the grip block of the invention is not restricted to use with the 3000 type closure inasmuch as it is readily adaptable to other closure configurations, often without any substantive modification. Half-shell 11 has flanges 12 and 13 thereon which mate with corresponding flanges in the other half-shell of the closure with a racetrack grommet 14 therebetween. At each end of closure 11 grommet 14 has a pair of entry and/or exit ports 16,16 and 17,17 in the form of insert receiving members adapted to receive sealing inserts 18 and 19, only one pair of which is shown. As is explained in the aforementioned Burek et al. U.S. Pat. No. 5,862,290 (Burek-290) these inserts 18 and 19 have an inner bore with projecting internal fingers or ridges which, when a cable 21 is inserted therein, form a seal therewith, and the inserts 18 and 19 are in turn sealed within the insert receiving members 16 and 17 of grommet 14. The bores of inserts 18 and 19 are preferably configured in the manner shown in U.S. Pat. Nos. 4,361,721 of Massey and U.S. Pat. No. 5,155,303 of Beusel III et al. to enhance the sealing action. These inserts are of the side entry type wherein the cable is introduced through slits in the side.

The closure configuration of FIG. 1 is that wherein a single cable 21 is entrant into the closure. As a consequence, for the reasons pointed out hereinbefore, it is desirable that cable 21 be completely immobilized as it enters and exits its entry port 16. To this end, and in accordance with the principles of the invention, there is provided a first grip block assembly 22 which comprises a base member 23 and an actuating member 24, to be discussed more fully hereinafter, which is mounted on a bracket 26 which is, in turn, mounted on the exterior of closure 11. As will be discussed hereinafter, the mounting for the bracket 26 does not penetrate the wall of member 11 and therefore has no affect upon the sealing thereof. A second grip block assembly 27, comprising a base member 28 and an actuating member 29 is mounted in the interior of the closure on studs 31 which extend from bosses 32, integral with member 11. In practice, when cable 21 is inserted through inserts 18 and 19, which, in turn are inserted in insert receiving members 16, and grip blocks 22 and 27 are tightened to where they grip cable 21 firmly, then cable 21 is immobilized through the ingress or egress ports, both exteriorly and interiorly thereof. Any torsion in cable 21 is prevented from affecting the sealing, as are any extraneous forces. Within the interior of closure 11, a central strength member anchor 33, which functions in the manner disclosed in the '290 Burek patent, is provided for further immobilizing to cable 21 by anchoring the central strength member thereof.

Figure 2:
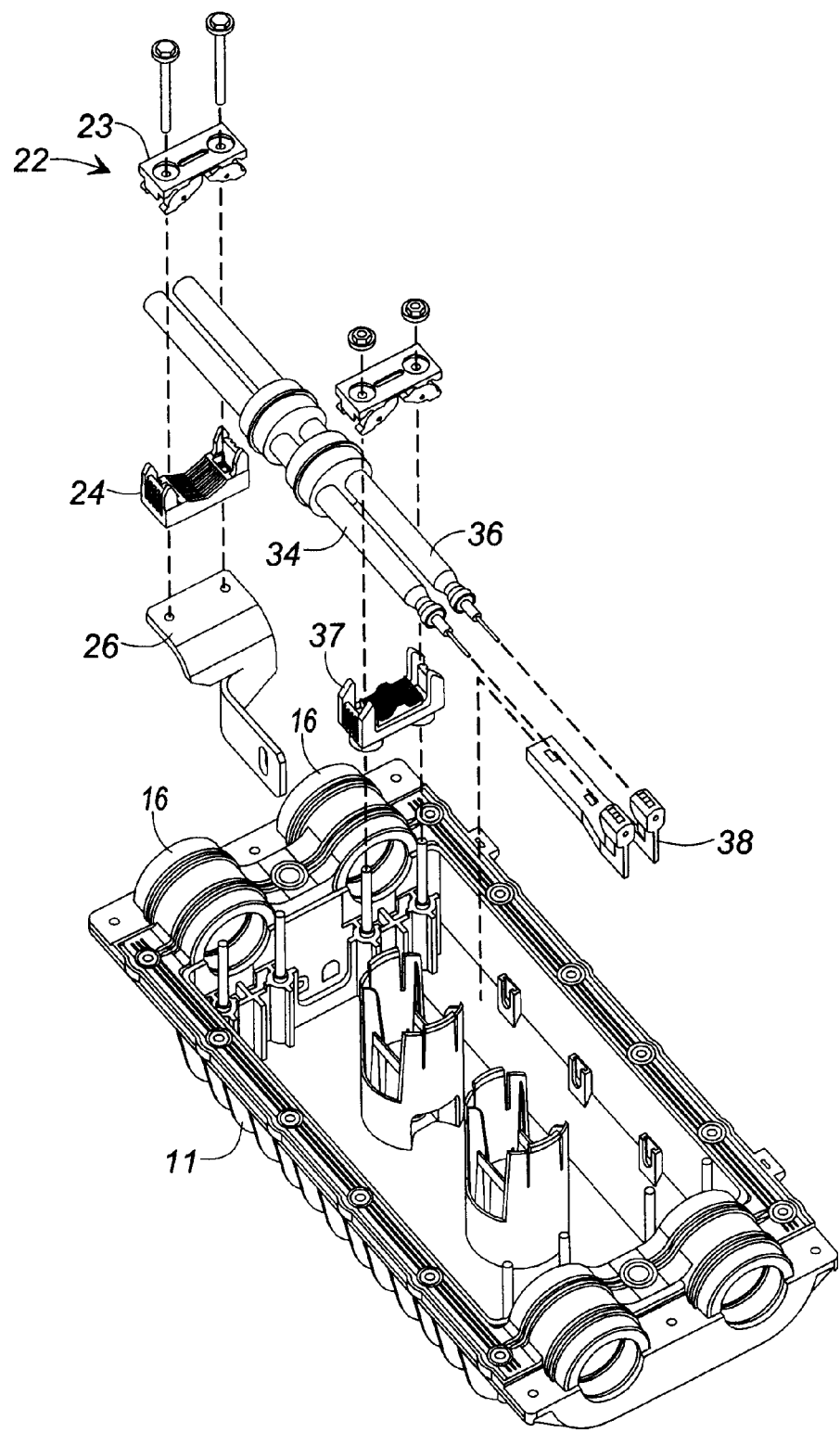
FIG. 2 is an exploded perspective view similar to FIG. 1 but using two cables.

FIG. 2 depicts the assembly for anchoring a pair of cables 34 and 36 wherein certain ones of the several components shown in FIG. 1 are replaced by modified versions thereof, all of which will be discussed hereinafter. Thus, in grip block assembly 27, actuating member 29 is replaced by actuating member 37. In addition and based upon the diameters of cables 34 and 36, actuating member 24 may also be replaced by a member 37. A double central strength member anchor 38 replaces member 33 in FIG. 1, thus providing an anchor for the strength member of each of the cables 34 and 36. It is to be understood that the terms "entry port" and "exit port" are simply meant to indicate their possible role. In actuality, all of the ports 16 and 17 may be considered to be entry ports, or any one port may be either an entry or an exit port, for example.

Figure 3:
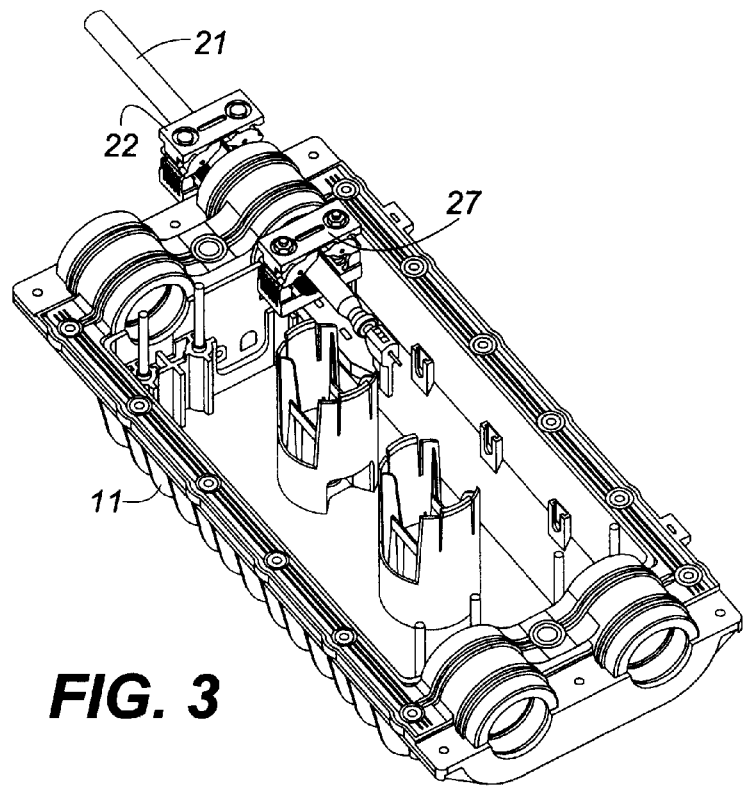
FIG. 3 is a perspective view of the elements of FIG. 1 assembled.
Figure 4:
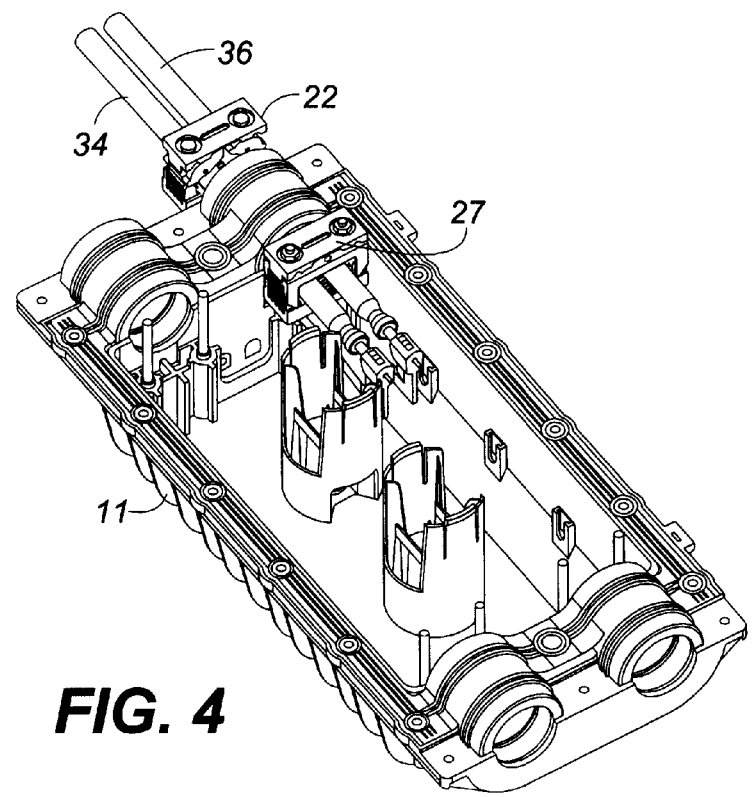
FIG. 4 is a perspective view of the elements of FIG. 2 assembled.

FIGS. 3 and 4 depict the grip blocks 22 and 27 assembled in their functioning positions for a single cable input (FIG. 3) and a dual cable input (FIG. 4). It can be seen that the grip blocks are inverted relative to each other. As discussed hereinbefore, the orientation of the grip blocks may vary depending on the cable size and member of cables, aimed at achieving linear cable orientation with a minimum of bending. A spacer member, not shown, may also be used as part of the grip block assembly to assist in insuring linearity.

FIGS. 3 and 4 are perspective views of the arrangement of FIGS. 1 and 2, respectively, illustrating the grip block assemblies 22 and 27 of the present invention in their fully assembled functional configuration.

Figure 5:
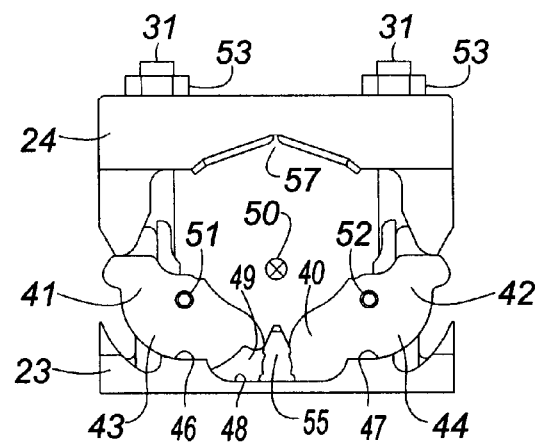
FIG. 5 is a front elevation view of the grip block assembly of the present invention as used for a single large cable or two relatively small cables.
Figure 6:
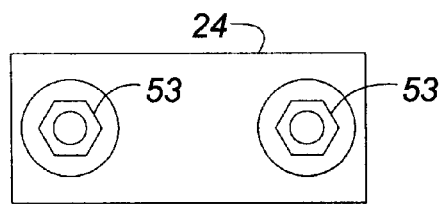
FIG. 6 is a top plan view of the assembly of FIG. 5.
Figure 7:
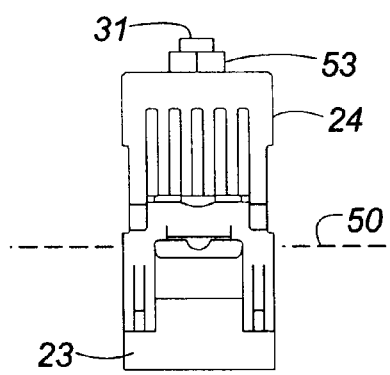
FIG. 7 is a side elevation view of the assembly of FIG. 5.
Figure 8:
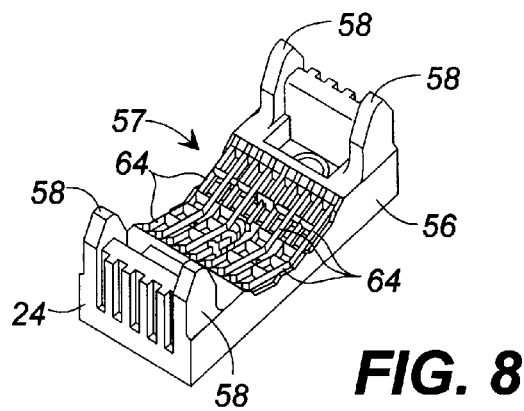
FIG. 8 is a perspective view of the actuator of the invention for use with one large cable or two relatively small cables.
Figure 9:
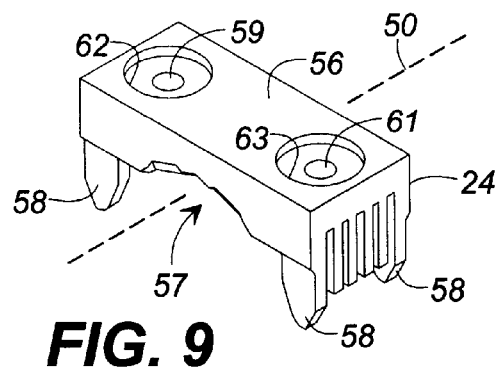
FIG. 9 is a second perspective view of the actuator of FIG. 8.
Figure 10:
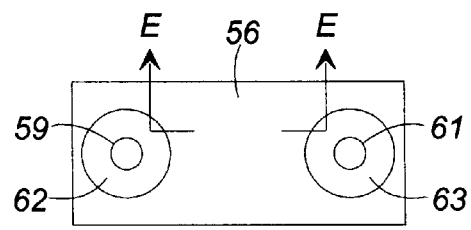
FIG. 10 is a top plan view of the actuator of FIG. 8.
Figure 11:
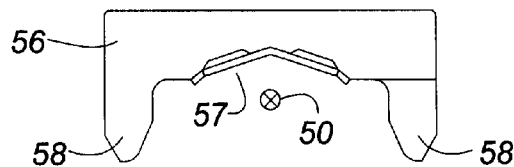
FIG. 11 is a front elevation view of the actuator of FIG. 8.

FIGS. 5, 6, and 7 are front elevation, side elevation, and top plan view, respectively, of the base member 23, or 28, of the grip block assembly 22 which is substantially the same as shown in the aforementioned Burek '160, and of actuating member 24 and 29 of the present invention. Base member 23 which is preferably of a suitable plastic material, has central longitudinal axis 50 and comprises first and second cable engaging pivoted arms 41 and 42 having partially circular lobes 43 and 44 thereon which bear against arcuate bearing surfaces 46 and 47. A cutout portion 48 provides clearance for the ends of the arms 41 and 42, as shown and a projecting member 55 extends upward from portion 48 upon which the cable rests prior to actuation of the pivot arms 41 and 42. Arm 41 has, at the end 40 thereof, a relief portion 49 to provide clearance for the end 40 of V-arm 42 when the arms 41 and 42, mounted on pivot pins 51 and 52, are pivoted upward. Member 23 also has vertical bores (not shown) therein for mounting on studs 31 (see FIG. 1) and nuts 53 secure both base member 23 and actuating member 24 to the studs and hence to the closure 11. As will be discussed hereinafter, the bores also serve in mounting the grip block assembly 22 to bracket 26. Base member 23 or 28 differs from the corresponding member shown in the Burek '666 patent in that each of the arms 41 and 42, at the end 40 thereof comprises a plurality of fingers, arrayed longitudinally, which will best be seen in subsequent figures which, when two arms 41 and 42 are pivoted upward, interdigitate with each other, hence the need for the relief portion 49. The array of fingers on the ends 40 of the arms provides a much firmer gripping of the cable or cables, and is much more resistant to axial pulling forces than heretofore.

Figure 12:
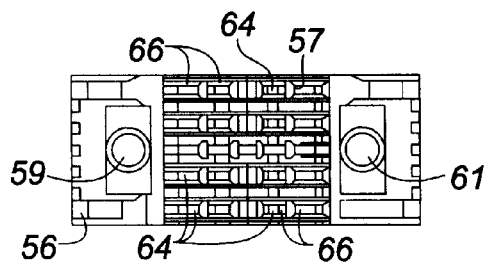
FIG. 12 is a plan view of the V-groove of the actuator of FIG. 8.
Figure 13:
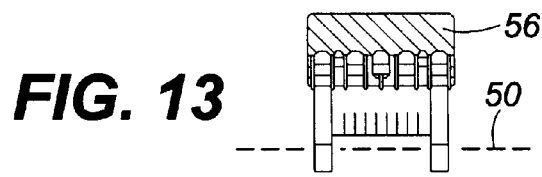
FIG. 13 is a side elevation partially cross sectional view of the actuator of FIG. 8.
Figure 14:
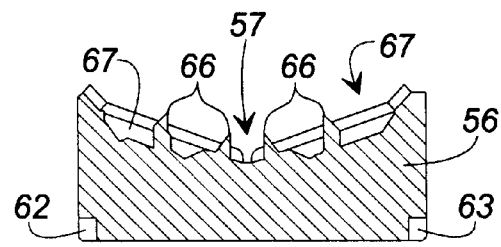
FIG. 14 is a cross-sectional view along the line E—E of FIG. 10.
Figure 15:
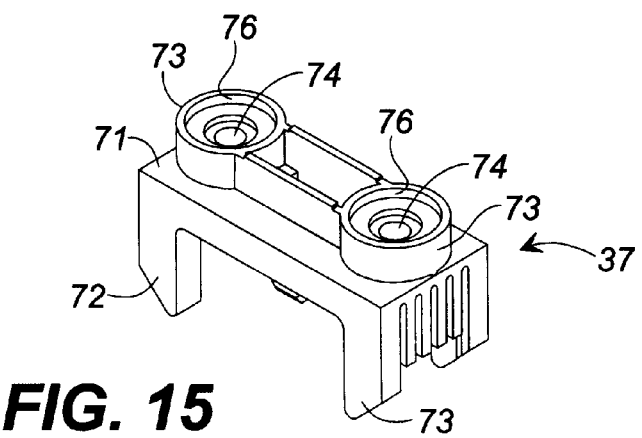
FIG. 15 is a perspective view of the actuator of the invention for use with two relatively large cables.

Actuating member 24, shown in FIGS. 8 through 14 is for use with base member 23 or 28 in clamping either single cables 21 or smaller diameter twin cables 34, 36 as 25 shown in FIGS. 1 and 2. Member 24 comprises a body portion 56 having a V-shaped groove 57 therein which extends parallel to central axis 50 and depending actuating pins 58, the ends of which bear against pivot arms 41 and 42, as best seen in FIG. 5. Body 56 also has bores 59 and 61 extending therethrough for receiving the mounting means, such as studs 31 or bolts, or other suitable means. Bores 59 and 61 have counterbores 62 and 63 in the top surface of body member 56 which receive a spacer member, not shown, where necessary in accomplishing axial alignment of the grip block assembly with the entry port as discussed hereinbefore. V-shaped cable receiving groove 57 has a plurality of transverse ridges 64 arrayed longitudinally on each face of the V-groove 57 which provide a high resistance to axial forces on the cable when the cable is forced into the groove 57 by pivot arms 41 and 42. Also extending from the V-groove faces are a plurality of projections 66 located between the ridges 64, which extend in longitudinal arrays, as seen in FIG. 12. It can be seen in FIG. 14 that the arrays of projections 66 effectively form longitudinal channels 67 normal to axis 50 in which the smaller diameter twin cable fit, that function to prevent the cables from displacement along the sloping faces of the V-groove. The bottom (apex) of the V-groove 57 thus becomes a third channel, for a single fiber that is oriented parallel to axis 50. Thus, as will be discussed more fully hereinafter, the cables, when forced into the channels, are effectively immobilized laterally. It can be appreciated, therefore, that the arrangement of ridges 64 and projections 66 function to immobilize the cable or cables within the V-groove 57 from either longitudinal or lateral movement. As explained in the aforementioned Burek '160, patent, when the nuts 53 are tightened, pins 58 bear against the ends of pivot arms 41 and 42, causing them to pivot so that their ends 40 force the cable or cables being gripped into the V-groove 57 where they are firmly gripped.

Figure 16:
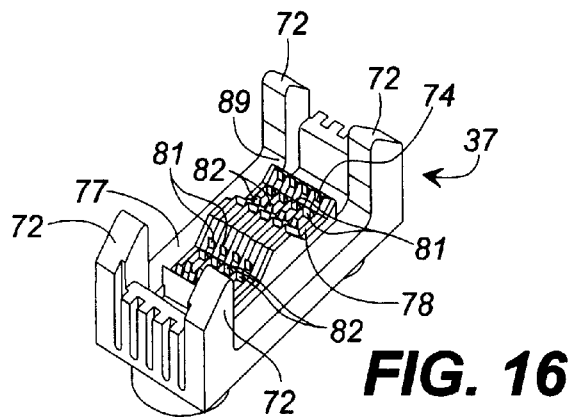
FIG. 16 is a second perspective view of the actuator of FIG. 15.
Figure 17:
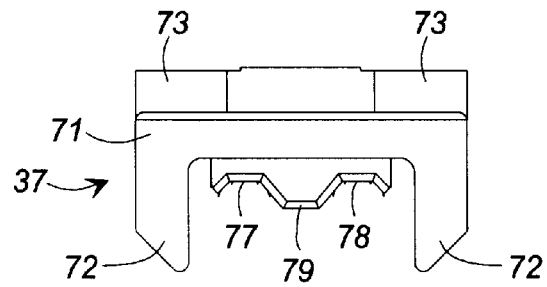
FIG. 17 is a front elevation view of the actuator of FIG. 15.
Figure 18:
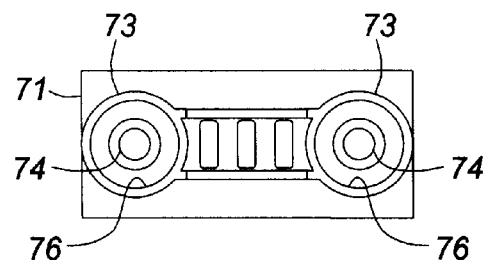
FIG. 18 is a top plan view of the actuator of FIG. 15.
Figure 19:
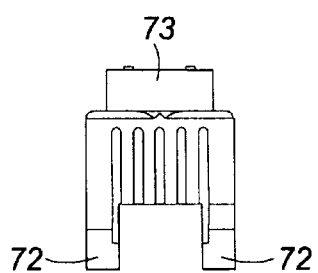
FIG. 19 is a side elevation view of a of the actuator of FIG. 15.
Figure 20:
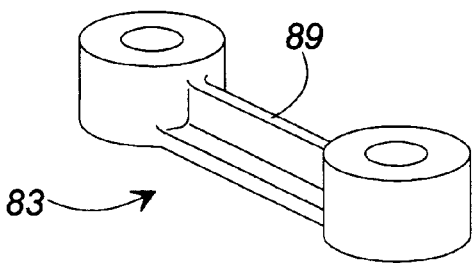
FIG. 20 is a perspective view of a spacer for use with the grip block of the invention.
Figure 21:
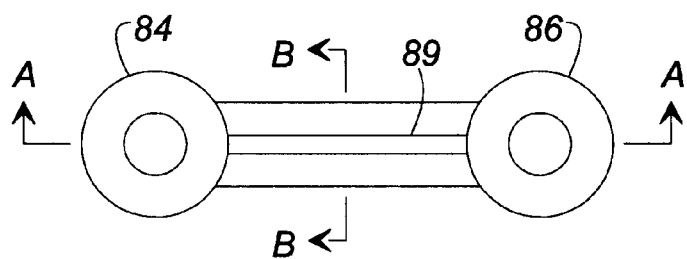
FIG. 21 is a top plan view of the spacer of FIG. 20.
Figure 22:
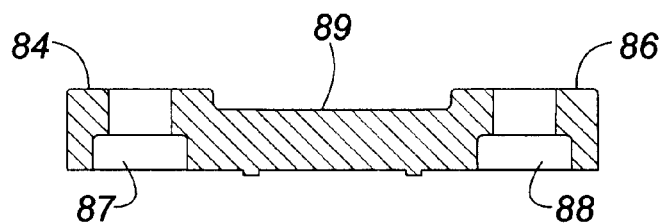
FIG. 22 is a cross-sectional view along the line A—A of FIG. 21.
Figure 23:
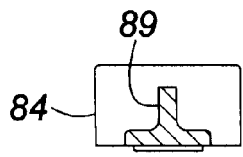
FIG. 23 is a cross-sectional view along the line B—B of FIG. 21.
Figure 24:
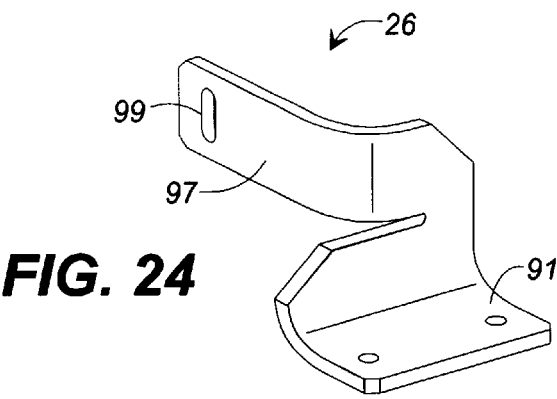
FIG. 24 is a perspective view of the mounting bracket for the grip block of the present invention.
Figure 25:
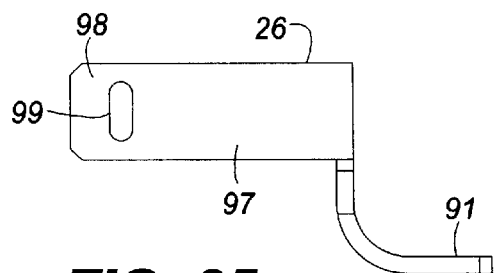
FIG. 25 is a side elevation view of the bracket of FIG. 24.

In FIGS. 15 through 19 there is shown a second actuator 37 configuration for use with dual cables each having a diameter too large to fit readily in the channels 67 of the V-groove actuator of FIGS. 8 through 14. Actuator 37 comprises a body member 71 having depending actuator pins 72 which function in the same manner as pins 58 of actuator 24. On the top surface of body 71 are bosses 73 through each of which a mounting bore 74 extends. Bore 74 likewise extends through body 71. Each of the bosses may have a countersink 76 for receiving an aligning spacer, not shown. In place of V-groove 57 of actuator 24, actuator 37 has a raised channel forming block which, as best seen in FIG. 17, forms first and second cable receiving channels 77 and 78, in truncated V-groove configuration, with a raised separator 79 therebetween. As best seen in FIG. 16, each V-groove 77,78 has a plurality of transversely extending ribs 81, with a plurality of projections 82 between the ribs and arrayed longitudinally in the same manner as projections 66 in V-groove 57 of actuator 24. The ribs 81 and projections 82 perform in the same manner as their corresponding elements in V-groove 57. In both V-groove 57 and channel 77 and 78, the projections 66 and 81 are pointed so as to bite into the insulating or protective jacket of the cable or cables, thereby enhancing the gripping and anchoring of the cable. In operation the actuator 37 functions in the same manner as actuator 24, with each channel 77,78 holding one cable forced into it by the pivot arms 41 and 42.

A spacer member 83 is shown in FIGS. 20 through 23, for use in aligning the axis of that portion of the cable gripped in one or both grip blocks 22, 27 with the axis of the cable passing through inserts 18 and 19 so that there will be minimum bending of the cable. Spacer member 83 comprises first and second round portions 84 and 86 having countersunk bores 87,88 passing therethrough. Portions 84 and 86 are joined by a T-shaped web 89, best seen in FIG. 23, which is a cross-section along the line B—B of FIG. 21. The spacing between the centers of bores 87 and 88 is the same as the spacing of the bores 74 in actuator 37, the spacing of bores 59 and 61 of actuator 24, and the spacing of the studs 31, the diameter of portions 84 and 86 is such that they fit within the countersunk portions 62 and 63 of actuator 24, or, if necessary, within the countersunk portions 76 of actuator 37. It can be appreciated that several spacers 83, of differing heights, may be supplied so that an optimum vertical position of the grip block can be realized.

Figure 26:
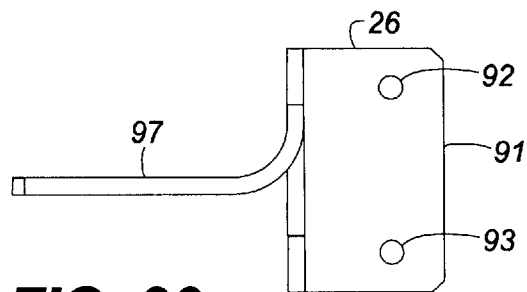
FIG. 26 is a top plan view of the bracket of FIG. 24.
Figure 27:
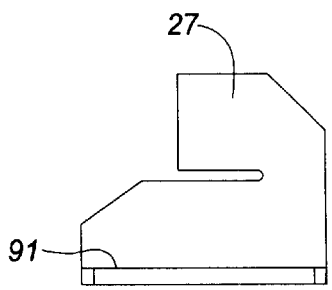
FIG. 27 is a front elevation view of the bracket of FIG. 24.
Figure 28:
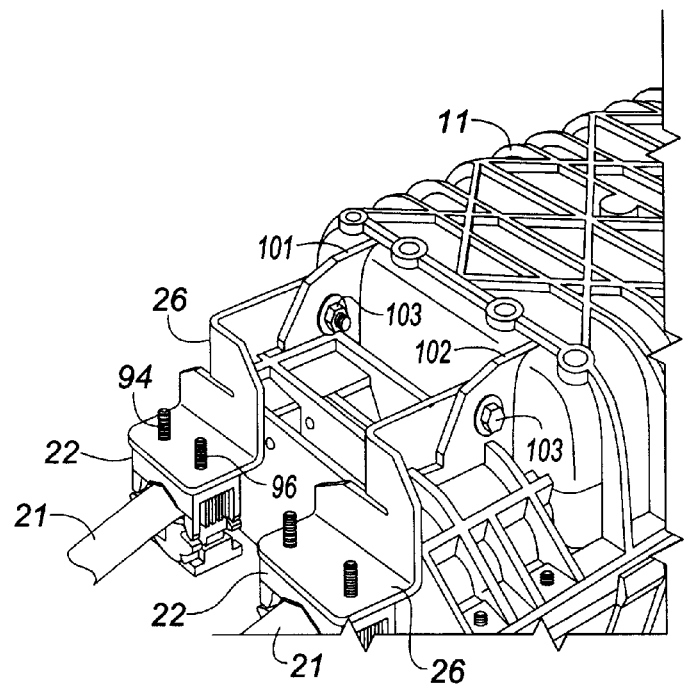
FIGS. 28 and 29 are perspective views illustrating the mounting of the grip block of the invention to a closure using the bracket of FIG. 24.
Figure 29:
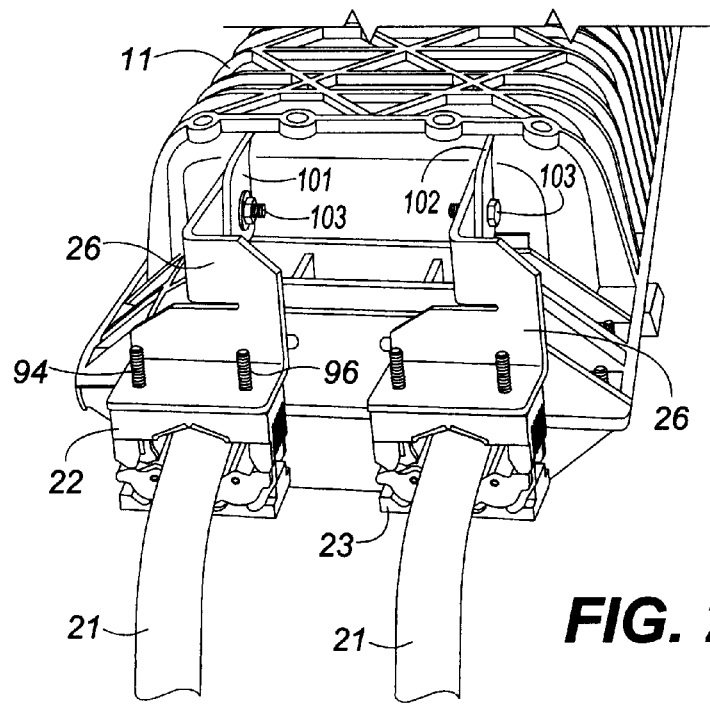

FIGS. 24 through 27 depict, in detail, the mounting bracket 26 for the external mounting of a grip block assembly 22 as shown in FIGS. 1 and 2, and FIGS. 28 and 29 depict the completed external mounting of grip block assembly 22. Bracket 26 comprises an L-shaped support plate 91 having first and second holes 92 and 93 therein for receiving bolts 94 and 96, which support the grip block assembly 22 and which, when fastening nuts (not shown) are tightened, cause the actuator of assembly 22 to grip the cable 21 in the manner explained hereinbefore. Extending from the member 91 is an elongated mounting arm 97 having a distal end 98 having a slot 99 therein for adjustable mounting of bracket 26 to ribs 101 and 102, best seen in FIGS. 28 and 29 by suitable means, such as bolts 103. The plane of arm 97 is normal to that of support plate 91, and is also normal to a line joining the centers of holes 92 and 93, as best seen in FIG. 26.

Figure 30:
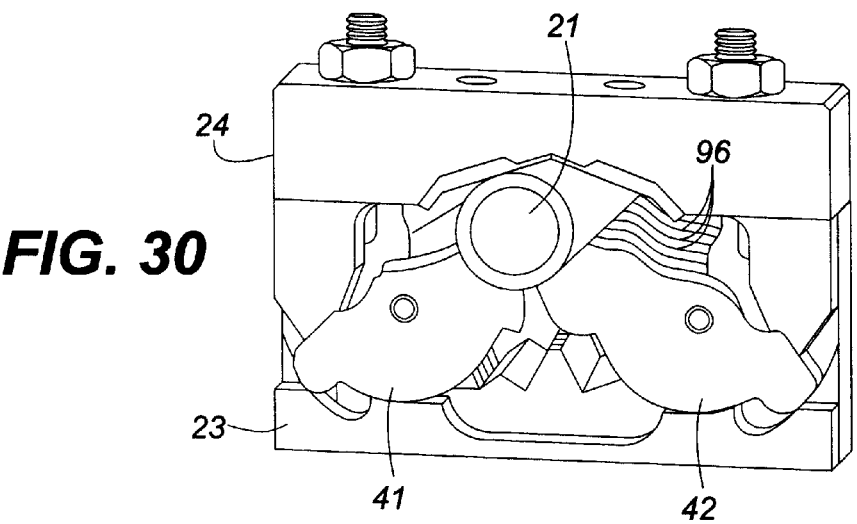
FIGS. 30, 31, and 32 are perspective views illustrating the grip block of the invention as used with a single large cable, two relatively small cables, and two relatively large cables respectively.
Figure 31:
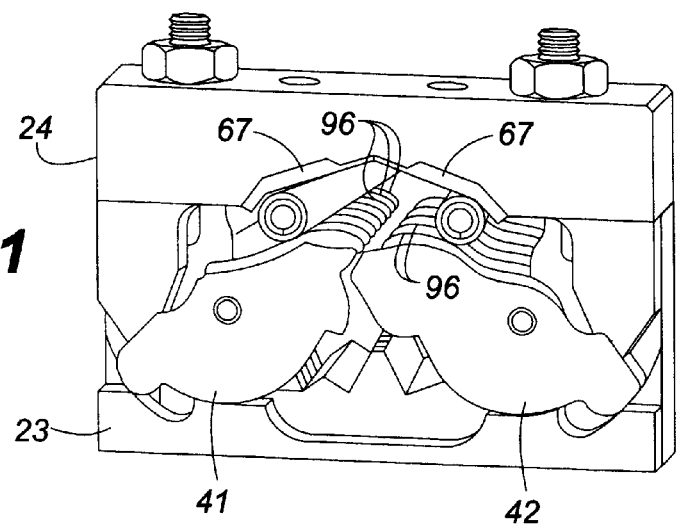
Figure 32:
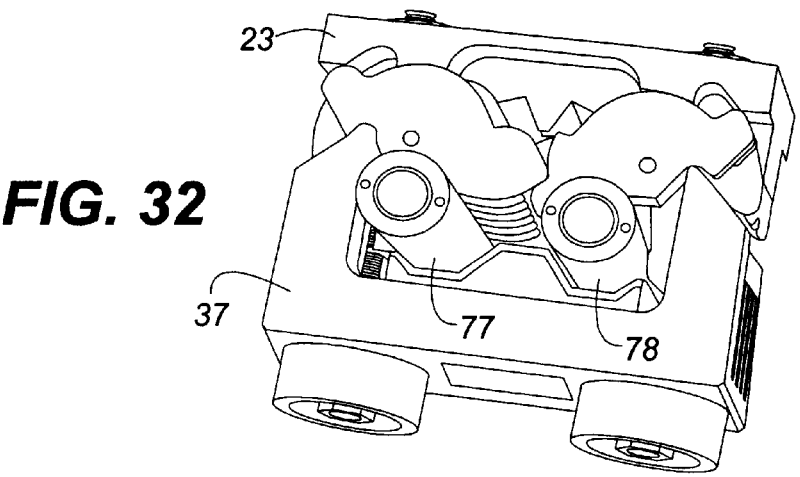

FIGS. 30 through 32 are perspective views illustrating the versatility of the grip block assembly of the present invention and in which the interdigitation fingers 96 of the pivot arms. FIG. 30 depicts the assembly, either 22 or 27, using the actuator 24 or 29 for gripping a large single cable 21, showing how the cable 21 is forced into V-groove 57 by the pivot arms 41 and 42. FIG. 31 illustrates the assembly of FIG. 30 as used with two relatively small cables 34 and 36 with the cables being forced into and held by channels 67, as discussed hereinbefore. FIG. 32 depicts the use of actuator 37 with relatively large twin cables 34 and 36, with the cables being forced into channels 77 and 78. It can be appreciated from these figures that the grip block assembly of the present invention is cable of handling a larger range of cable sizes, as well as single or double cables, immobilizing the cable at the entrance (or exit) ports.

In conclusion, it should be noted that it will be obvious to those skilled in the art that many variations and modifications may be made to the preferred embodiment, including use with other than splice closures or the particular closure shown, without departure from the principles of the present invention. All such variations and modifications are intended to be included herewith as being within the scope of the present invention, as set forth in the claims. Further, in the claims hereafter, the corresponding structures, materials, acts, and equivalents of all means or steps plus function elements are intended to include any structure, material, or acts for performing the functions with other elements as specifically claimed.

What is claimed is:

1. A grip block assembly for gripping and holding one or more elongated cylindrical members, said grip block comprising:
   a base member having a central axis and first and second pivoted arms mounted on either side of the axis;
   an actuating member comprising a body having two or more channels parallel to the central axis for holding an elongated cylindrical member in each channel; and
   actuating elements depending from said body for bearing against said pivoted arms to pivot them into engagement with the cylindrical member.

2. A grip block assembly as claimed in claim 1 and further including aligned bores in said base member and said actuating member for mounting said grip block assembly.

3. A grip block assembly as claimed in claim 1 wherein said actuating member has a centrally located V-groove therein facing said base member.

4. A grip block assembly as claimed in claim 3 wherein said V-groove has a plurality of spaced transversely extending ridges arrayed on the sloping walls of said V-groove.

5. A grip block assembly as claimed in claim 4 wherein said V-groove has a plurality of individual projections arrayed longitudinally parallel to said central axis and forming at least one longitudinal channel extending substantially parallel to said central axis.

6. A grip block assembly as claimed in claim 5 wherein each of said individual projections is located between two adjacent transverse ridges.

7. A grip block assembly as claimed in claim 5 wherein there is a longitudinal array of projections on each of the sloping walls of said V-groove forming two longitudinal channels.

8. A grip block assembly as claimed in claim 1 wherein said actuating member has a first surface having a raised channel forming block thereon having first and second spaced longitudinally extending channels thereon facing said base member.

9. A grip block assembly as claimed in claim 8 wherein said channels are substantially parallel to said central axis.

10. A grip block assembly as claimed in claim 9 wherein each of said channels has a truncated V-groove configuration.

11. A grip block assembly as claimed in claim 10 wherein each of said truncated V-grooves has a plurality of spaced transversely extending ribs array longitudinally along the length of the V-groove.

12. For use with a splice closure having a plurality of external ribs, a cable grip block assembly for mounting to the exterior of the closure, said grip block assembly comprising, in combination:
   a base member having a central axis;
   first and second pivot arms mounted on said base member, on opposite sides of said central axis;
   an actuating member comprising a body having a first surface having two or more cable receiving channels therein extending substantially parallel to said central axis;
   actuating pins depending from said body and adapted to bear against a first end of each of said pivot arms; and
   means for causing said actuating pins to rotate said pivot arms into engagement with one or more cables in said cable receiving channels.

13. A grip block assembly as claimed in claim 12 wherein each of said pivot arms has a second end having a plurality of spaced fingers, said fingers being adapted to interdigitate when said pivot arms are rotated.

14. A grip block assembly as claimed in claim 12 wherein the means for causing said actuating pins to rotate said pivot arms comprises first and second threaded members extending through aligned bores in said base member and said actuating member and having nuts thereon adapted to bear against one of said actuating member and said base member.

15. A grip block assembly as claimed in claim 14 and further including a mounting bracket for attaching said grip block thereto by means of said threaded members.

16. A grip block assembly as claimed in claim 15 wherein said bracket comprises an L-shaped support plate having a flat portion for supporting said grip block and an elongated mounting arm extending from said L-shaped plate, the plane of said arm being normal to the plan of said support plate.

17. A grip block assembly as claimed in claim 16 wherein said mounting arm has a distal end having a slot therein for bolting said bracket to one of the ribs on said closure.

18. A grip block assembly as claimed in claim 12 and further comprising a spacer member for altering the vertical position of said grip block.

* * * * *